(12) United States Patent
Shaheen et al.

(10) Patent No.: US 8,630,176 B2
(45) Date of Patent: *Jan. 14, 2014

(54) BI-DIRECTIONAL AND REVERSE DIRECTIONAL RESOURCE RESERVATION SETUP PROTOCOL

(75) Inventors: Kamel M Shaheen, King of Prussia, PA (US); Sharif M Shahrier, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/312,021

(22) Filed: Dec. 6, 2011

(65) Prior Publication Data

US 2012/0076096 A1 Mar. 29, 2012

Related U.S. Application Data

(63) Continuation of application No. 12/170,825, filed on Jul. 10, 2008, now Pat. No. 8,085,664, which is a continuation of application No. 10/288,065, filed on Nov. 4, 2002, now Pat. No. 7,400,582.

(60) Provisional application No. 60/336,304, filed on Nov. 2, 2001.

(51) Int. Cl.
*H04L 12/28* (2006.01)
*H04L 12/56* (2011.01)
*G06F 15/16* (2006.01)

(52) U.S. Cl.
USPC ......... 370/231; 370/328; 370/395.2; 709/227

(58) Field of Classification Search
USPC ............... 370/229–238.1, 395.2–395.31; 455/3.01–3.06; 709/226–229
See application file for complete search history.

(56) References Cited

U.S. PATENT DOCUMENTS

| 5,881,064 A | 3/1999 | Lin et al. |
| 6,366,577 B1 * | 4/2002 | Donovan ............... 370/352 |
| 6,385,195 B2 | 5/2002 | Sicher et al. |

(Continued)

FOREIGN PATENT DOCUMENTS

| EP | 1032179 | 2/1999 |
| EP | 0905995 | 3/1999 |

(Continued)

OTHER PUBLICATIONS

Braden et al. "Resource ReSerVation Protocol (RSVP)—Version 1 Functional Specification." Network Working Group, Sep. 1997, pp. 18-21.

(Continued)

*Primary Examiner* — Tri H Phan
(74) *Attorney, Agent, or Firm* — Volpe and Koenig, P.C.

(57) ABSTRACT

A wireless user equipment (UE) configured to initiate a packet based session includes a reservation setup protocol (RSVP) message generator configured to transmit a RSVP PATH message. The RSVP PATH message includes a direction indication. The direction indicator indicates that reservations should be made for the UE to transmit only, to receive only or to both transmit and receive. The UE also includes an RSVP message receiver configured to receive an RSVP RESV message indicating that reservations have been made as a result of the RSVP PATH message.

10 Claims, 8 Drawing Sheets

(56) References Cited

U.S. PATENT DOCUMENTS

| | | | |
|---|---|---|---|
| 6,496,479 B1 | 12/2002 | Shionozaki | |
| 6,519,254 B1* | 2/2003 | Chuah et al. | 370/389 |
| 6,538,416 B1 | 3/2003 | Hahne et al. | |
| 6,563,794 B1 | 5/2003 | Takashima et al. | |
| 6,654,610 B1* | 11/2003 | Chen et al. | 455/450 |
| 6,671,276 B1 | 12/2003 | Bakre et al. | |
| 6,728,365 B1* | 4/2004 | Li et al. | 379/329 |
| 6,757,266 B1 | 6/2004 | Hundscheidt | |
| 6,760,774 B1* | 7/2004 | Soumiya et al. | 709/233 |
| 6,920,499 B2 | 7/2005 | Chen | |
| 6,931,448 B2 | 8/2005 | Holler et al. | |
| 6,950,397 B1* | 9/2005 | Ho et al. | 370/235 |
| 6,973,035 B2* | 12/2005 | Seddigh et al. | 370/235 |
| 6,999,436 B2 | 2/2006 | Zheng et al. | |
| 7,027,400 B2 | 4/2006 | O'Neill | |
| 7,123,598 B1 | 10/2006 | Chaskar | |
| 7,143,168 B1 | 11/2006 | DiBiasio et al. | |
| 7,281,043 B1 | 10/2007 | Davie | |
| 7,369,536 B2 | 5/2008 | Donovan et al. | |
| 7,394,772 B2 | 7/2008 | Shin et al. | |
| 7,400,582 B2* | 7/2008 | Shaheen et al. | 370/231 |
| 8,085,664 B2* | 12/2011 | Shaheen et al. | 370/231 |
| 2001/0026554 A1 | 10/2001 | Holler et al. | |
| 2001/0027490 A1 | 10/2001 | Fodor et al. | |
| 2001/0054103 A1 | 12/2001 | Chen | |
| 2002/0015395 A1 | 2/2002 | Karagiannis | |
| 2002/0085494 A1 | 7/2002 | Seddigh et al. | |
| 2002/0091810 A1 | 7/2002 | Hundscheidt et al. | |

FOREIGN PATENT DOCUMENTS

| | | |
|---|---|---|
| EP | 1120939 | 8/2001 |
| JP | 2005-327710 | 12/1993 |
| JP | 2001-053675 | 2/2001 |
| KR | 1999-0026884 | 4/1999 |
| KR | 2000-0032284 | 6/2000 |
| KR | 2000-0072377 | 12/2000 |
| KR | 2001-0010980 | 2/2001 |
| KR | 2005-90088 | 9/2005 |

OTHER PUBLICATIONS

Brunner et al., Internet Draft, NEC, entitled: Requirements for QoS Signaling Protocols, May 2002, pp. 1-59.

Cable Television Laboratories, Inc., "PacketCable™ Dynamic Quality-of-Service Specification", PKT-SP-DQOS-I02-000818, ©1999, 2000, pp. 1-203.

Eriksson, "Real-Time Services Over the Internet," World Telecommunications Congress, International Switching Symposium, pp. 173-179 (Sep. 21, 1997).

Shahrier et al., "A Framework for Bi-Directional QoS Signaling," Internet Draft, (Dec. 2002).

Shenker et al. "General Characterization Parameters for Integrated Service Network Elements", Network Working Group, RFC 2215, Sep. 1997.

Shenker et al. "Network Element Service Specification Template", Network Working Group, RFC 2216, Sep. 1987.

Shenker et al. "Specification of Guaranteed Quality of Service", Network Working Group, RFC 2212, Sep. 1997.

Srinivasan, "XDR: External Data Representation Standard", Network Working Group, RFC 1832, Aug. 1995.

Talukdar et al., MRSVP: A Resource Reservation Protocol for an Integrated Services Network With Mobile Host, http://citeseer.nj.nec.com/181006.htm, pp. 1-25, 1997.

Teraoka, "Next Generation Internet," bit, vol. 30, No. 11, pp. 9-14 (Nov. 1998).

Watanabe et al., "Gateway for Media Cruising Resource Reservation Protocol in ATM Network," Joint 4$^{th}$ IEEE International Conference on ATM, pp. 269-273 (2001).

Wright et al., "CR-LDP Extensions for Interworking with RSVP-TE," IETF Standard-Working-Draft, Internet Engineering Task Force (Mar. 2000).

Wroclawski, "Specification of the Controlled-Load Network Element Service", Network Working Group, RFC 2211, Sep. 1997.

Wroclawski, "The Use of RSVP with IETF Integrated Services", Network Working Group, RFC 2210, Sep. 1997.

Kan et al, Internet Draft, Nokia Research Center, entitled: Two-plane and Three-tier QoS Framework for Mobile Ipv6 Networks, Apr. 2002, pp. 1-16.

Shaheen et al, Internet Draft, InterDigital, entitled The Use of Bi-Directional RSVP in the Wireless Internet, Jul. 2002, pp. 1-16.

Baker et al. "RSVP Cryptographic Authentication", Network Working Group, RFC 2747, Jan. 2000.

Cable Television Laboratories, Inc., "PacketCable™ Dynamic Quality-of-Service Specification", PKT-SP-DQOS-I02-000818, © 1999, 2000, pp. 1-203.

Shenker et al. "Network Element Service Specification Template", Network Working Group, RFC 2216, Sep. 1997.

Talukdar et al., MRSVP: A Resource Reservation Protocol for an Integrated Services Network With Mobile Hosts, http://citeseer.nj.nec.com/181006.htm, pp. 1-25, 1997.

* cited by examiner

FORWARD DIRECTION  54₁
INDICATOR

| 0000 | IP HEADER 56 |
|------|--------------|
| OBJECT 1 (FORWARD) 58_F1 ||
| ⋮ ||
| OBJECT N (FORWARD) 58_FN ||

FIG. 6

REVERSE
DIRECTION INDICATOR  54₂

| 0011 | IP HEADER 56 |
|------|--------------|
| OBJECT 1 (REVERSE) 58_R1 ||
| ⋮ ||
| OBJECT N (REVERSE) 58_RN ||

FIG. 7

BI-DIRECTIONAL
DIRECTION INDICATOR  54₃

| 1111 | IP HEADER 56 |
|------|--------------|
| OBJECT F1 (FORWARD) 58_F1 ||
| ⋮ ||
| OBJECT FN (FORWARD) 58_FN ||
| OBJECT R1 (REVERSE) 58_R1 ||
| ⋮ ||
| OBJECT RN (REVERSE) 58_RN ||

FIG. 8

```
<PATH MESSAGE> ::= <COMMON HEADER> [ <INTEGRITY> ]
                   <SESSION> <RSVP_HOP>
                   <TIME_VALUES>
                   [ <POLICY_DATA> ... ]
                   [ <SENDER DESCRIPTOR> ]
<SENDER DESCRIPTOR> ::= <SENDER_TEMPLATE> <SENDER_TSPEC>
                        [ <ADSPEC> ]
```

FIG. 9

| 31 | 24 | 23 | 16 | 15 | 8 | 7 | 0 |
|---|---|---|---|---|---|---|---|
| 1 (a) | | RESERVED | | | | 7 (b) | |
| 1 (c) | 0 | RESERVED | | | | 6 (d) | |
| 127 (e) | | 0 (f) | | | | 5 (g) | |
| TOKEN BUCKET RATE [r] (FORWARD) ||||||||
| TOKEN BUCKET SIZE [b] (FORWARD) ||||||||
| PEAK DATA RATE [p] (FORWARD) ||||||||
| MINIMUM POLICED UNIT [m] (FORWARD) ||||||||
| MAXIMUM PACKET SIZE [M] (FORWARD) ||||||||
| TOKEN BUCKET RATE [r] (REVERSE) ||||||||
| TOKEN BUCKET SIZE [b] (REVERSE) ||||||||
| PEAK DATA RATE [p] (REVERSE) ||||||||
| MINIMUM POLICED UNIT [m] (REVERSE) ||||||||
| MAXIMUM PACKET SIZE [M] (REVERSE) ||||||||

FIG. 10

| 31 | 24 | 23 | 16 | 15 | 8 | 7 | 0 |
|---|---|---|---|---|---|---|---|
| 1(c) | | X | RESERVED | | | 8(d) | |
| 4(e) | | | (f) | | | 1(g) | |
| IS HOP CNT (32-BIT UNSIGNED INTEGER) ||||||||
| 6(h) | | | (i) | | | 1(j) | |
| PATH b/w ESTIMATE (FORWARD) ||||||||
| PATH b/w ESTIMATE (REVERSE) ||||||||
| 8(k) | | | (l) | | | 1(m) | |
| MINIMUM PATH LATENCY (FORWARD) ||||||||
| MINIMUM PATH LATENCY (REVERSE) ||||||||
| 10(n) | | | (o) | | | 1(p) | |
| COMPOSED MTU (FORWARD) ||||||||
| COMPOSED MTU (REVERSE) ||||||||

FIG. 11

| 31 | 24 | 23 | 16 | 15 | 8 | 7 | 0 |
|---|---|---|---|---|---|---|---|
| 2(c) | | X | RESERVED | | | 8(d) | |
| 4(e) | | | (f) | | | 1(g) | |
| END-TO-END COMPOSED VALUE FOR C [Ctot] (FORWARD) ||||||||
| END-TO-END COMPOSED VALUE FOR C [Ctot] (REVERSE) ||||||||
| 134(f) | | | (g) | | | 1(h) | |
| END-TO-END COMPOSED VALUE FOR D [Dtot] (FORWARD) ||||||||
| END-TO-END COMPOSED VALUE FOR D [Dtot] (REVERSE) ||||||||
| 135(i) | | | (j) | | | 1(k) | |
| SINCE-LAST-RESHAPING POINT COMPOSED C [Csum] (FORWARD) ||||||||
| SINCE-LAST-RESHAPING POINT COMPOSED C [Csum] (REVERSE) ||||||||
| 136(l) | | | (m) | | | 1(n) | |
| SINCE-LAST-RESHAPING POINT COMPOSED D [Dsum] (FORWARD) ||||||||
| SINCE-LAST-RESHAPING POINT COMPOSED D [Dsum] (REVERSE) ||||||||
| SERVICE-SPECIFIC GENERAL PARAMETER/VALUE IF PRESENT ||||||||

FIG. 12

```
<RESV MESSAGE> ::= <COMMON HEADER> [ <INTEGRITY> ]
                   <SESSION>  <RSVP_HOP>
                       <TIME_VALUES>
                       [ <RESV_CONFIRM> ]  [ <SCOPE> ]
                       [ <POLICY_DATA> ... ]
                       <STYLE>  <FLOW DESCRIPTOR LIST>
<FLOW DESCRIPTOR LIST> ::=  <EMPTY>
                            <FLOW DESCRIPTOR LIST>  <FLOW DESCRIPTOR>
```

FIG. 13

| 31 | 24 23 | 16 15 | 8 7 | 0 |
|---|---|---|---|---|
| (a) | | RESERVED | 7 (b) | |
| 5 (c) | 0 | RESERVED | 6 (d) | |
| 127 (e) | | 0 (f) | 5 (g) | |
| TOKEN BUCKET RATE [r] (FORWARD) | | | | |
| TOKEN BUCKET SIZE [b] (FORWARD) | | | | |
| PEAK DATA RATE [p] (FORWARD) | | | | |
| MINIMUM POLICED UNIT [m] (FORWARD) | | | | |
| MAXIMUM PACKET SIZE [M] (FORWARD) | | | | |
| TOKEN BUCKET RATE [r] (REVERSE) | | | | |
| TOKEN BUCKET SIZE [b] (REVERSE) | | | | |
| PEAK DATA RATE [p] (REVERSE) | | | | |
| MINIMUM POLICED UNIT [m] (REVERSE) | | | | |
| MAXIMUM PACKET SIZE [M] (REVERSE) | | | | |

FIG. 14

| 31 | 24 23 | 16 15 | 8 7 | 0 |
|---|---|---|---|---|
| (a) | UNUSED | | 10 (b) | |
| 2 (c) | 0 | RESERVED | 9 (d) | |
| 127 (e) | 0 (f) | | 5 (g) | |
| TOKEN BUCKET RATE [r] (FORWARD) ||||
| TOKEN BUCKET SIZE [b] (FORWARD) ||||
| PEAK DATA RATE [p] (FORWARD) ||||
| MINIMUM POLICED UNIT [m] (FORWARD) ||||
| MAXIMUM PACKET SIZE [M] (FORWARD) ||||
| TOKEN BUCKET RATE [r] (REVERSE) ||||
| TOKEN BUCKET SIZE [b] (REVERSE) ||||
| PEAK DATA RATE [p] (REVERSE) ||||
| MINIMUM POLICED UNIT [m] (REVERSE) ||||
| MAXIMUM PACKET SIZE [M] (REVERSE) ||||
| 130 (h) | 0 (i) | | 2 (j) | |
| RATE [ R ] {FORWARD} ||||
| SLACK TERM [ S ] {FORWARD} ||||
| RATE [ R ] (REVERSE) ||||
| SLACK TERM [ R ] {REVERSE} ||||

FIG. 15

BI-DIRECTIONAL AND REVERSE DIRECTIONAL RESOURCE RESERVATION SETUP PROTOCOL

CROSS REFERENCE TO RELATED APPLICATION(S)

This application is a continuation of U.S. patent application Ser. No. 12/170,825, filed Jul. 10, 2008, which is a continuation of U.S. patent application Ser. No. 10/288,065, filed Nov. 4, 2002, which issued Jul. 15, 2008 as U.S. Pat. No. 7,400,582, which claims priority from U.S. provisional application No. 60/336,304, filed Nov. 2, 2001, which are incorporated by reference as if fully set forth.

FIELD OF INVENTION

The present invention relates to wireless packet based communications. In particular, the invention relates to establishing wireless packet based communications.

BACKGROUND

For certain Internet applications, resources are reserved to achieve the necessary quality of service (QOS). The reservation of resources allows packet based networks to operate like circuit switched networks. FIG. 1 is an illustration of a simplified wireless packet based, such as Internet based, communication session, such as for wireless Internet, wireless multimedia, voice over Internet Protocol, video conferencing or video telephony, between two wireless users, user A and user B. Differing sessions have differing performance requirements, such as setup time, delay, reliability, integrity and quality of service (QOS). User A is shown as user equipment (UE) 20 and user B is shown as UE 22. User A sends and receives communicates via the packet network 28 using its cellular network 24. User B similarly sends and receives communications via the packet network 28 using its cellular network 26.

FIG. 2 is an illustration of establishing such a session. User A sends a resource reservation setup protocol (RSVP) PATH message 30 to establish the session. The RSVP PATH message 30 is sent to user B via various network routers (Router 1-Router N). Each router determines whether the resources are available for the session. If adequate resources are available, the RSVP PATH message 30 is updated and passed to the next router. If adequate resources are not available, an error message is sent back to user A. When user B receives the RSVP PATH message 30, user B responds by sending a RSVP reservation (RESV) message 32 to reserve the resources throughout the networks 24, 26, 28. As the RSVP RESV message 32 is sent through the networks, resources are allocated to support the communications from user A to user B. If the resources are successfully allocated, user A receives the RSVP RESV message 32. User A sends a confirmation (RSVP confirm) message 34 to user B to acknowledge receipt of the RSVP RESV message 32.

To allocate resources for user B's communications to user A, user B sends a RSVP PATH message 30 to user A via various network routers (Router 1-Router N). When user A receives the RSVP PATH message 30, user A responds by sending a RSVP RESV message 32 to reserve the resources throughout the networks 24, 26, 28. As the RSVP RESV message 32 is sent through the networks 24, 26, 28, resources are allocated to support the communications from user B to user A. If the resources are successfully allocated, user B receives the RESV message 32. User B sends a RSVP confirm message 34 to user A to acknowledge receipt of the RSVP RESV message 34.

To maintain the resource allocations, Refresh PATH messages 36 are periodically sent through the networks 24, 26, 28. User A sends Refresh PATH messages 36 through the networks 24, 26, 28 to user B to maintain the resources for user A's transmissions and user B sends Refresh PATH messages 36 through the networks 24, 26, 28 to user A to maintain the resources for user B's transmissions. If the Refresh PATH messages 36 are not sent, the reservation states will expire with the allocated resources being released.

Sending all these messages to allocate resources uses valuable network resources. Accordingly, it is desirable to have alternate approaches to establishing wireless Internet sessions.

SUMMARY

A wireless user equipment (UE) configured to initiate a packet based session is disclosed. The UE includes a reservation setup protocol (RSVP) message generator configured to transmit a RSVP PATH message. The RSVP PATH message includes a direction indication. The direction indicator indicates that reservations should be made for the UE to transmit only, to receive only or to both transmit and receive. The UE also includes an RSVP message receiver configured to receive an RSVP RESV message indicating that reservations have been made as a result of the RSVP PATH message.

BRIEF DESCRIPTION OF THE DRAWING(S)

FIG. 6 is a simplified illustration of a preferred forward direction reservation setup message.

FIG. 7 is a simplified illustration of a preferred reverse direction reservation setup protocol message.

FIG. 8 is a simplified illustration of a preferred bi-directional reservation setup protocol message.

FIG. 9 is an illustration of a preferred bi-directional reservation setup protocol PATH message.

FIG. 10 is an illustration of the SENDER_TSPEC of FIG. 9.

FIGS. 11 and 12 are illustrations of the ADSPEC of FIG. 9.

FIG. 13 is an illustration of a preferred bi-directional reservation setup protocol reservation message.

FIGS. 14 and 15 are illustrations of FLOWSPECs of the bi-directional reservation setup protocol reservation message of FIG. 13.

DETAILED DESCRIPTION OF THE PREFERRED EMBODIMENT(S)

Figure 1:
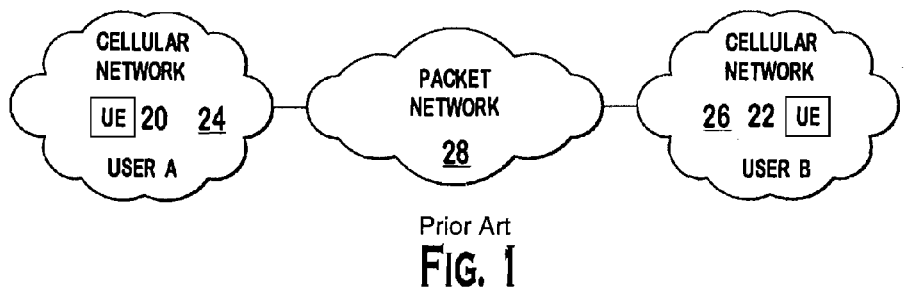
FIG. 1 is an illustration of simplified wireless packet based communication system.
Figure 2:
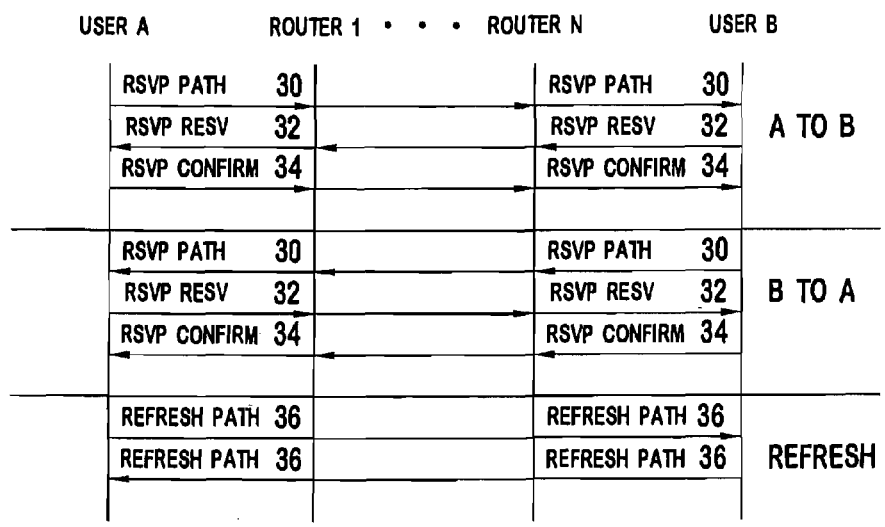
FIG. 2 is an illustration of establishing a wireless packet session.
Figure 3:
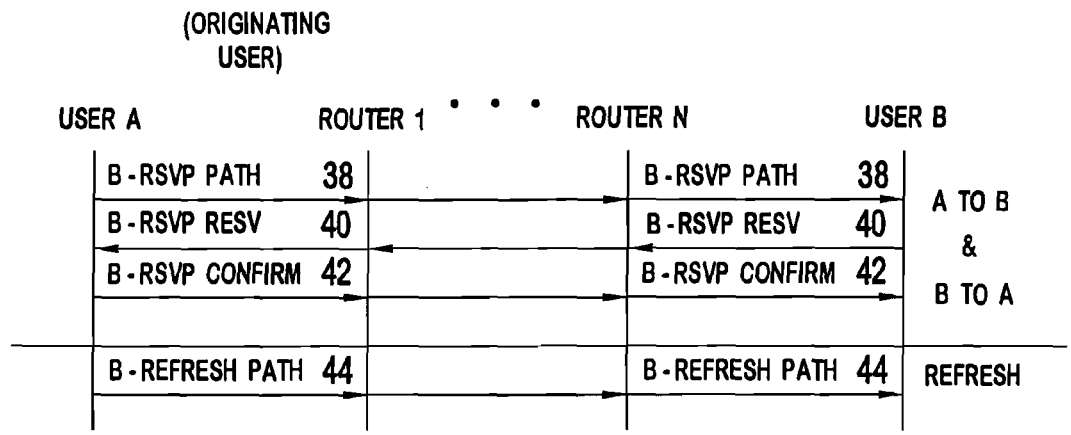
FIG. 3 is an illustration of establishing a wireless packet session using bi-directional reservation setup protocol.

FIG. 3 is an illustration of bi-directional resource reservation setup protocol. User A desires to setup a bi-directional packet based, such as Internet, session with user B. The requirements, such as bit rate and relative delay, for the session are based on prior negotiations. Both users A and B may be wireless users or one of the two is a wireless user and the other is a wired user. To initiate the session, user A (the originating user) sends a bi-directional RSVP PATH message 38. The bi-directional RSVP PATH message 38 contains resource allocation information for both the communications transmitted from user A to user B and from user B to user A. The preferred format of these communications is discussed in more detail in conjunction with FIGS. 8, 9, 10, 11 and 12. Although the invention is described primarily in conjunction with two-direction communications, the invention is extendable to any multiple party communications, such as three-way calling.

The bi-directional RSVP PATH message 38 is send through the various routers (Router 1-Router N) of the networks to user B. User B sends a bi-directional RSVP RESV message 40 to allocate the resources for both users through the networks 24, 26, 28. A preferred bi-directional RSVP RESV message 40 is described in more detail in conjunction with FIGS. 8, 13, 14 and 15. Upon transferring the bi-directional RSVP RESV message 40, each network allocates the resources for both user A's and user B's transmissions. Upon receiving the bi-directional RSVP RESV message 40, indicating that the resources have been successfully allocated, user A sends a bi-directional RSVP confirm message 42 to user B through the networks. Upon receiving the bi-directional RSVP confirm message 42, bi-direction communication between users A and B begins. Preferably, the originating user, user A, is responsible for the session, such as for billing purposes. Making the originating user responsible for the session simplifies billing procedures.

To maintain the resource allocations, periodically, bi-directional Refresh PATH messages 44 are sent by user A through the networks to user B. Upon transferring the bi-directional Refresh PATH messages 44, the networks maintain the resource allocations for both directions.

Using the bi-directional messages reduces overhead required for the establishment of the session. Instead of both user A and user B sending RSVP PATH 30, RSVP RESV 32 and RSVP confirm 34 messages, only one user sends bi-directional messages. Although the information carried by each of these messages is typically increased, by reducing the number of messages, the overall network overhead is decreased. Additionally, the bi-directional messaging avoids call scenarios, where the resources in one direction are established and the resources in the other direction are not. The reduced overhead lessens the impact on air resources and improves network performance.

Figure 4:
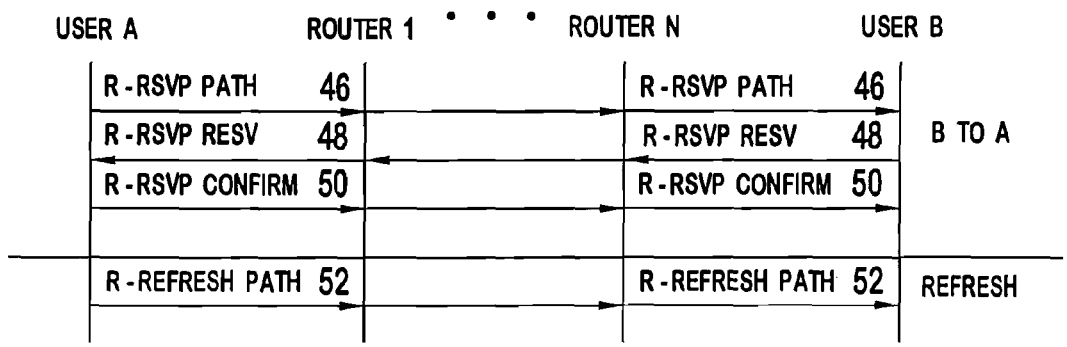
FIG. 4 is an illustration of establishing a wireless packet session using reverse direction reservation setup protocol.

FIG. 4 is an illustration of reverse resource reservation setup protocol. User A desires to setup an Internet session where only user B transmits information. Both users A and B may be wireless users or one of the two is a wireless user and the other is a wired user. To initiate the session, user A (the originating user) sends a reverse direction RSVP PATH message 46. The reverse direction RSVP PATH message 46 contains resource allocation information for user B's transmissions to user A.

The reverse direction RSVP PATH message 46 is send through the various routers (Router 1-Router N) of the networks to user B. User B sends a reverse direction RSVP RESV message 48 to allocate the resources for its transmission. Upon receiving the reverse direction RSVP RESV message 48, user A sends a reverse direction RSVP confirm message 50 to user B through the networks 24, 26, 28. Upon receiving the reverse direction RSVP confirm message 50, user B begins transferring data to user A. Preferably, user A (although user A is not transmitting any substantive information) is responsible for the session.

Figure 5:
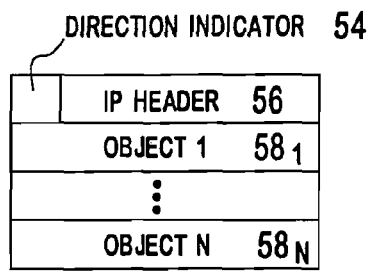
FIG. 5 is a simplified illustration of a preferred reservation setup message.

FIG. 5 is an illustration of a simplified preferred RSVP message, illustrating generically the RSVP PATH, RSVP RESV and RSVP confirm messages. The preferred message has an IP header having a direction indicator, (forward, reverse and bi-directional) and having objects $58_1$-$58_N$. Preferably, the message is based on and is backward compatible with RFC 2205 and the direction indicator is a four bit indicator. For RFC 2205, the four bits of the direction indicator $54_1$ are assigned the value "0000" for the forward direction (the originating user only sends information). A preferred forward direction RSVP message is shown in FIG. 6, with only objects $58_{F1}$-$58_{FN}$ for the forward direction, "(FORWARD)", being included. In RFC 2205, each user (each of users A and B) is an originating user. A value "0011" for the direction indicator $54_2$ indicates the reverse direction (the originating user only receives information). A preferred reverse direction RSVP message is shown in FIG. 7. In FIG. 7, all of the objects $58_{R1}$-$58_{RN}$ are for the reverse direction, "(REVERSE)". A value "1111" for the direction indicator $54_3$ indicates both directions are used (the originating user will receive and send). A preferred bi-directional RSVP message is shown in FIG. 8. In FIG. 8, both "(FORWARD)" $58_{F1}$-$58_{FN}$ and "(REVERSE)" $58_{R1}$-$58_{RN}$ objects are present.

FIG. 9 is an illustration of a preferred bi-directional RSVP PATH message compatible with RFC 2205. The bi-directional RSVP PATH message has fields for the "<Path Message>", "<Common Header>", "<INTEGRITY>", "<SESSION>", "<RSVP_HOP>", "<TIME_VALUES>", "<POLICY_DATA>", "<sender description>", "<sender descriptor>", "<SENDER_TEMPLATE>", "<SENDER_TSPEC>" and "<ADSPEC>".

FIG. 10 is an illustration of a "<SENDER_TSPEC>". Along the top of the figure are numbers indicating the bit positions from bit position 0 to 31. As shown in FIG. 10 for a bi-directional RSVP PATH message, both "(Forward)" and "(Reverse)" information is included.

Two illustrations of the "<ADSPEC>" field are shown in FIGS. 11 and 12. FIG. 11 illustrates a PATH Default ADSPEC and FIG. 12 illustrates a PATH Guaranteed Service ADSPEC. As shown in those figures, both ADSPECs contain both forward and reverse information.

FIG. 13 is an illustration of a preferred bi-directional RSVP RESV message compatible with RFC 2205. The bi-directional RSVP RESV message has fields for "<Resv Message>", "<Common Header>", "<INTEGRITY>", "<SESSION>", "<RSVP_HOP>", "<TIME_VALUES>", "<RESV_CONFIRM>", "<SCOPE>", "<POLICY_DATA>", "<STYLE>", "<flow descriptor list>" and "<flow descriptor>".

The direction indicator is included in the "<flow descriptor list>". Two illustrations of preferred FLOWSPECs of the "<flow descriptor list>" are shown in FIGS. 14 and 15. FIG. 14 is a FLOWSPEC for Guaranteed service and FIG. 15 is a FLOWSPEC for Guaranteed Service Extension Format. As shown in FIGS. 14 and 15 for a bi-directional RSVP RESV message, both forward and reverse direction information is carried by the message.

Figure 16:
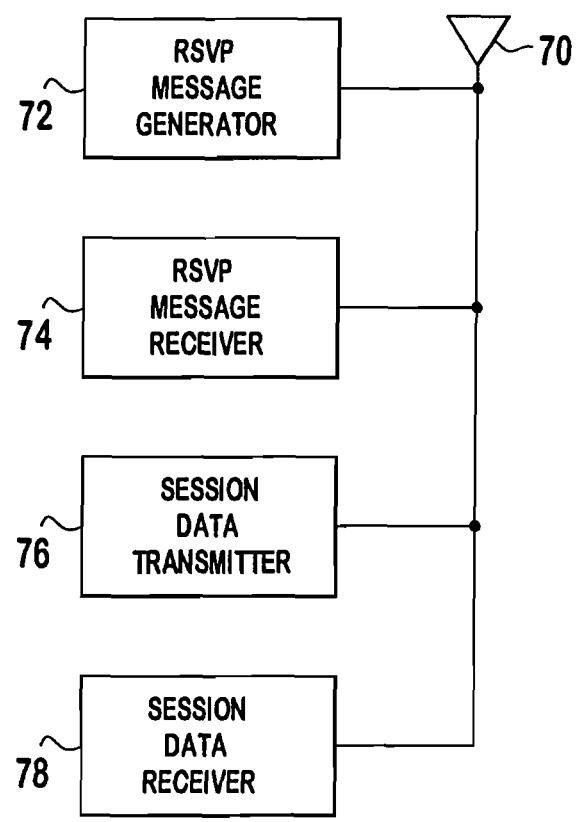
FIG. 16 is a simplified block diagram of a wireless user equipment.

FIG. 16 is a block diagram of a wireless user equipment for use in bi-directional, reverse direction and forward direction reservation setup protocol messaging. A RSVP message generator 72 produces the RSVP PATH messages (including bi-directional RSVP and reverse direction RSVP PATH messages), RSVP RESV messages (including bi-directional RSVP and reverse direction RSVP RESV messages), RSVP Confirm messages (including bi-directional RSVP and reverse direction RSVP Confirm messages) and Refresh PATH messages (including bi-directional and reverse direction Refresh Path messages). A RSVP receiver is used to receive the various RSVP messages. The messages that the UE transmits or receives is based on the whether the UE is the originating user or non-originating user, as previously described.

Session data is transmitted and received using a session data transmitter 76 and a session data receiver 78. An antenna 70 or antenna array are used to radiate and receive the various messages and communications across the air interface.

What is claimed is:

1. A method for reserving resources for communication, the method comprising:

sending a first message to a communication peer via a network comprising a plurality of routers for reserving resources along a path to the communication peer; and receiving a second message from the communication peer in response to the first message, wherein resources for communication in both directions to and from the communication peer are reserved by routers along the path as the second message traverses the network along the path.

2. The method of claim 1 further comprising:

sending a refresh message along the path, wherein the resources are maintained by the routers upon receipt of the refresh message.

3. The method of claim 2 wherein the refresh message is sent periodically.

4. The method of claim 1 wherein the first message includes a direction indicator indicating that the resources need to be reserved for both directions to and from the communication peer.

5. The method of claim 1 further comprising:

sending a confirmation message to the communication peer in response to the second message.

6. An apparatus for reserving resources for communication, the apparatus comprising:

a reservation message generator for sending a first message to a communication peer via a network comprising a plurality of routers for reserving resources along a path to the communication peer; and a reservation message receiver for receiving a second message from the communication peer in response to the first message, wherein resources for communication in both directions to and from the communication peer are reserved by routers along the path as the second message traverses the network along the path.

7. The apparatus of claim 6 wherein the reservation message generator is configured to send a refresh message along the path, wherein the resources are maintained by the routers upon receipt of the refresh message.

8. The apparatus of claim 7 wherein the refresh message is sent periodically.

9. The apparatus of claim 6 wherein the first message includes a direction indicator indicating that the resources need to be reserved for both directions to and from the communication peer.

10. The apparatus of claim 6 wherein the reservation message generator is configured to send a confirmation message to the communication peer in response to the second message.

* * * * *